United States Patent [19]

Hackenberg

[11] 4,350,425
[45] Sep. 21, 1982

[54] FILM TRANSPORT ARRANGEMENT FOR A CAMERA

[75] Inventor: Hubert Hackenberg, Holzkirchen, Fed. Rep. of Germany

[73] Assignee: AGFA-Gevaert Aktiengesellschaft, Leverkusen, Fed. Rep. of Germany

[21] Appl. No.: 260,281

[22] Filed: May 4, 1981

[30] Foreign Application Priority Data

May 29, 1980 [DE] Fed. Rep. of Germany ....... 3020396

[51] Int. Cl.³ .............................................. G03B 1/24
[52] U.S. Cl. .................................. 354/207; 354/204; 354/217
[58] Field of Search ............................ 354/204–209, 354/212–216, 217, 218; 242/71.4–71.6

[56] References Cited

U.S. PATENT DOCUMENTS

| | | | |
|---|---|---|---|
| 2,340,624 | 2/1944 | Simmon | 354/212 X |
| 3,896,467 | 7/1975 | Hamada | 354/206 X |
| 3,925,798 | 12/1975 | Sanada et al. | 354/214 X |

FOREIGN PATENT DOCUMENTS 2910104  9/1980  Fed. Rep. of Germany .

Primary Examiner—John Gonzales
Attorney, Agent, or Firm—Michael J. Striker

[57] ABSTRACT

A film transport arrangement of a camera for a film accommodated in a cassette, has transporting device arranged to transport a film before its exposure in a first transport direction from a cassette into a film receiving space of a camera, and to move the film after its exposure in a second transport direction in stepped manner frame after frame back into the cassette, or vice versa, and a film transport handle arranged for acting upon the transporting device so as to move the film in both directions and formed as a transport slider which is displaceable in two displacement directions and has a stroke of displacement in one of the displacement directions sufficient to transport the entire film length in a respective one of the transport directions.

6 Claims, 1 Drawing Figure

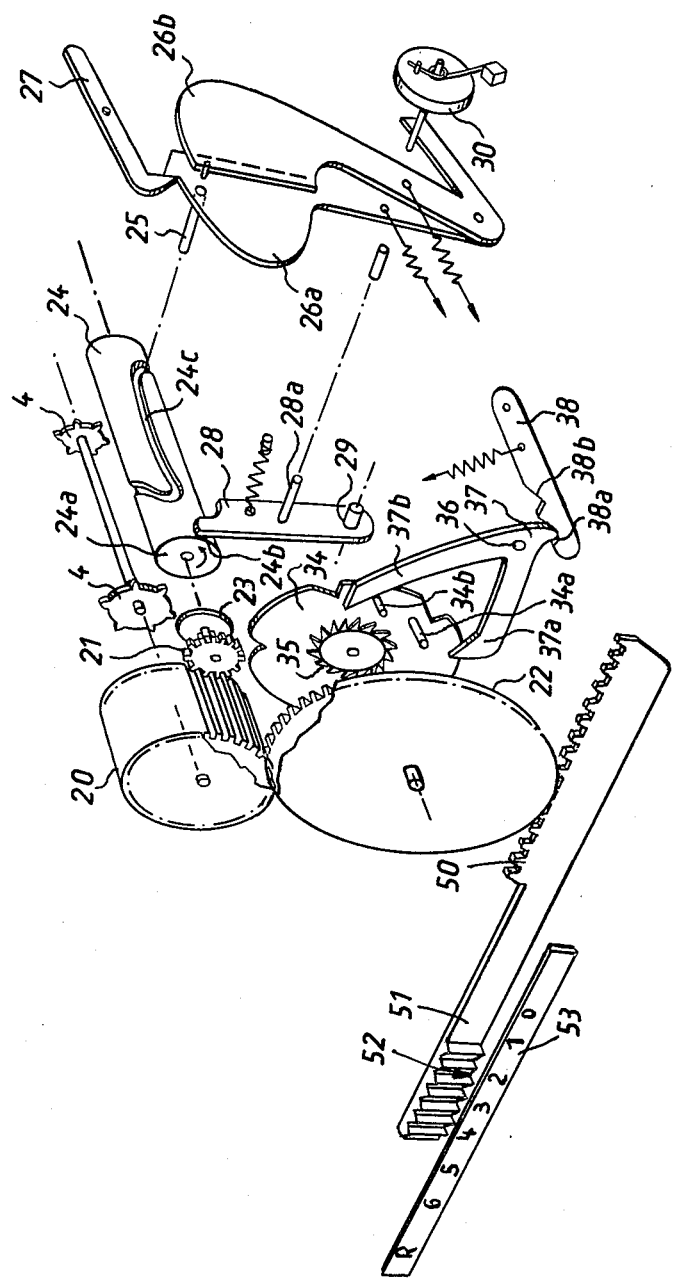

FILM TRANSPORT ARRANGEMENT FOR A CAMERA

BACKGROUND OF THE INVENTION

The present invention relates to a film transport arrangement for a camera, for films accommodated in cassettes. More particularly, it relates to a film transport arrangement for films which are transported from the cassette before the exposure into a film-receiving space of the camera, and moved back after the exposure in stepped manner, frame after frame, back into the cassette, or vice versa, wherein a film transport handle is provided for film transport in both directions.

Film transport arrangements of the above-mentioned general type as well as miniature cameras are known in the art. For example, they are disclosed in the German patent application P 2 901 104.9. Film transport in this camera is performed by rotation of a rotary head or a crank, which is difficult for example in condition of winter sports with sports gloves. Moreover, these cameras have a special frame-counting mechanism which involve mounting expenses and are provided with such small-scale numbers that they cannot be read by persons with poor vision without glasses or can be only approximately estimated.

SUMMARY OF THE INVENTION

Accordingly, it is an object of the present invention to provide a film transport arrangement for a camera, which avoids the disadvantages of the prior art.

More particularly, it is an object of the present invention to provide a film transport arrangement which is easy to handle and does not require a special frame-counting mechanism.

Still another object of the present invention is to provide a film transport mechanism which attains the above mentioned objects and at the same time is designed so that the scale numbers of a frame-counting scale can be bigger and be easier read or estimated.

In keeping with these objects, and with others which will become apparent hereinafter, one feature of the present invention resides, briefly stated, in a film transport arrangement having transporting means to transport the film before its exposure in a first transport direction from a cassette, and to transport the film after its exposure in a second transport direction in stepped manner frame after frame back into the cassette, and a film transport handle arranged for acting upon the transporting means so as to move the film in both directions, wherein the film transport handle is formed as a transport slider displaceable in two displacement directions and having a stroke of displacement in one of the displacement directions which is sufficient to transport the entire film length in a respective one of the transport directions.

In accordance with another feature of the present invention, the arrangement is provided with means for double-exposure blocking, and connecting means acting only in direction corresponding to the movement of the film in the second transport direction in stepped manner and connecting the transport slider with the double-exposure blocking means. The connecting means may be formed as a driving coupling connecting the transport slider with the double-exposure blocking means.

Still another feature of the present invention resides in the fact that counting means for counting the frames is provided, the counting means including a first element arranged on the camera and a second element provided on the transport slider and associated with the first counting element. The first element may be formed as a counting scale fixedly mounted on the camera and having a length corresponding to the stroke of displacement of the transport slider, whereas the second element may be formed as a mark provided on the transport slider and associated with the scale.

Finally, still a further feature of the present invention resides in the fact that the transport slider is arranged so that it displaces along the longitudinal side of the camera.

When the film transport arrangement is designed in accordance with the present invention, it is not complicated in operation and does not require a special frame-counting mechanism. The scale numbers of the frame-counting scale are big and can be easily read or evaluated.

The novel features which are considered characteristic for the present invention are set forth in particular in the appended claims. The invention itself, however, both as to its construction and its method of operation, together with additional objects and advantages thereof, will be best understood from the following description of preferred embodiments when read in connection with the accompanying drawing.

BRIEF DESCRIPTION OF THE DRAWING

The single FIGURE of the drawing is a perspective view showing a film transport arrangement of a camera, in accordance with the present invention.

DESCRIPTION OF THE PREFERRED EMBODIMENT

The FIGURE shows a film transport and double-exposure blocking arrangement of a camera which is suitable for the transport of film strips accommodated in cassettes or short film rolls. The unexposed film is first withdrawn from the cassette and displaced in a single operation into a film-receiving space of the camera, then it is exposed frame after frame and transported back into the cassette in stepped manner.

A perforation gear 4 engages in the perforations of the film and forms a film transport means. The perforation gear 4 is connected with a gear wheel 20 which in turn engages with a gear wheel 21 and a gear wheel 22 having a considerably greater diameter. The gear wheel 21 is coupled via a one-side operating coupling 23 with a shutter-cocking roller 24. The latter has at its end a cam disk 24a with a blocking edge 24b and a curved groove 24c extending substantially along the roller.

A cocking pin 25 of a known shutter 26a, 26b engages in the groove 24c of the roller 24. A shutter release element locks the shutter 26a, 26b in the cocked position. In the cocked position of the shutter 26a, 26b and the blocked position of the cam disk 24a, 24b, an arcuate part of the groove 24c which corresponds to the arc described by the shutter sector 26a or its cocking pin 25 during its cycle, is located in the region of movement of the cocking pin 25. A blocking lever 28 rotatable about an axis 29 is arranged springy before the blocking edge 24b. The shutter-cocking direction corresponds to the clockwise direction.

When the shutter starts to operate by actuation of the shutter release member 27, the opening sector 26a runs first and then the closing sector 26b runs thereafter with a predetermined time interval. The time sequence can be determined by a mechanical adjusting device 30 or by electronic means. During this process the sector 26a strikes against a pin 28a and lifts the blocking lever 28 from the blocking edge 24b, so that the cocking roller 24 and the entire film transport drive together therewith can again be rotated from film transport and cocking operation. The roller 24 rotates now by one full revolution, and the shape of the groove 24c guarantees that the shutter is transported again in its shown cocked position, in which the blocking lever 28 again extends before the block edge 24b.

When the perforation gear 24 rotates in an opposite direction, the shutter-cocking roller 24 remains inoperative because of the one-sided operation of the coupling 23. Thereby, a film transport opposite to the transport direction during exposure is possible in a single operation. A toothed rack 50 engages with the gear wheel 22 and is connected with a handle which is formed as a reciprocating slider 51. A counting mark 52 is provided on the slider 51 and displaces along a rectilinear frame-counting scale 52 which extends over the entire region corresponding to the possible number of frames on the film. The scale 52 has a plurality of uniformly distributed numbers which correspond to frames of a not shown film. The counting mark 52 stands opposite to the number "0" during insertion of a cassette into the camera. The scale 53 is fixedly mounted on the camera.

Two blocking disks 34 and 35 with oppositely oriented teeth are connected with the gear wheel 22, and the blocking teeth of the blocking disk 34 are so arranged that they allow rotation in clockwise direction. The blocking disk 34 has two control projections 34a, 34b. The blocking disk 35, in contrast, allows rotation in counterclockwise direction. Both blocking disks 34, 35 are associated with a two-arm blocking lever 37 which is pivotable about an axis 36 and has two arms 37a and 37b. The end of the blocking lever 37 rests in one of two arresting grooves 38a, 38b of a spring-biased arresting lever 38. In dependence upon the position of the end of the blocking lever 37 in a respective one of the grooves 38a or 38b, either its arm 37a cooperates with the teeth of the blocking disk 34 or its arm 37b cooperates with the teeth of the blocking disk 35.

After the insertion of a film cassette into the camera, the slider 51 displaces along the scale 52 downwardly, and the blocking disks 34, 35 rotate in clockwise direction by one whole revolution. This is possible because the blocking lever 37 lies in the groove 38a and the arm 37a cooperates with the teeth of the disk 34. Because of the thus attained rotation of the perforation gear 4 over the gear wheel 20 in counterclockwise direction, the film is transported into the film-receiving space of the camera, whereas the shutter-cocking roller 24 remains inoperative. The scale 53 and the slider 51 are so designed that after a movement of the latter over the scale length the last film perforation hole or holes of the film are in engagement with the teeth of the perforation gear 4 and the gear wheel 22 performs approximately one full revolution. In this moment, the control pin 34a strikes against the arm 37b and presses the end of the lever 37 into the groove 38b, so that the arm 37a is lifted from the teeth of the blocking disk 34 and the arm 37b is retained in engagement with the blocking disk 34. Now only actuation of the slider 51 in stepped manner from the scale end upwardly and the gear wheel 22 in counterclockwise direction is possible, whereas the perforation gear 4 is driven clockwisely, and the shutter-cocking roller 24 is driven in its actuation and cocking direction counterclockwisely. Thus again only rotation of the gear wheel 22 in counterclockwise direction by one frame gauge and the respective stepped displacement of the slider 51 and thereby a shutter release are possible. At this point the film strip displaces back from the film-receiving space of the camera into the cassette. When the last frame is exposed and the film is moved in its initial position back into the cassette, the control pin 34b strikes against the arm 37b and turns the blocking lever 37 back into the groove 38a, so that the initial position of a cassette exchange shown in the drawing is attained.

It is to be understood that other constructions of film transport and double-exposure blocking means in connection with a camera are possible, suitable for transport of the film into the film-receiving space in one operation and stepped back transport of the film into the cassette with exposure of the individual frames. These other constructions are not shown for the sake of simplicity.

The important feature of the present invention is that the transport handle is formed as the slider 51 which moves in one operation along the immovable frame-counting scale 53 for transport of the film into the receiving space of the camera and moves back in stepped manner along this scale. This provides for the advantage in the fact that a special counting mechanism driven from the perforation gear 4 can be dispensed with, and the transport stroke and the frame-counting scale extending along a longitudinal side of the camera are releatively great, so that the frame-counting scale is easy to operate and sufficiently visible on the camera. This is especially important for persons with poor vision and sportsmen when the camera must be utilized without glasses and/or with sports gloves.

The inventive transport slider can naturally operate in an opposite case when the film is transported from the cassette in stepped manner and exposed, and then in one operation transported back into the cassette, whereas the entire transport stroke of the slider 51 must be sufficient for transport of the entire film length. This transport slider arrangement is particularly advantageous in the event of utilization of shorter film strips, for example such as disclosed in the patent application P 2 901 104.9.

It will be understood that each of the elements described above, or two or more together, may also find a useful application in other types of constructions differing from the types described above.

While the invention has been illustrated and described as embodied in a film transport arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A film transport arrangement of a camera for a film accommodated in a cassette, comprising transporting means arranged to transport a film before its exposure in a first transport direction from a cassette into a film receiving space of a camera to be exposed in the camera frame after frame, and to move the film after its exposure in a second transport direction in stepped manner frame after frame back into the cassette; and a film transport handle arranged for acting upon said transporting means so as to move the film in both directions, said film transport handle being formed as a transport slider which is displaceable in two displacement directions and has a stroke of displacement in one of said displacement directions sufficient to transport the entire film length in a respective one of said transport directions.

2. A transport arrangement as defined in claim 1; and further comprising means for double exposure blocking, and connecting means acting only in direction corresponding to the movement of the film in said second transport direction in stepped manner and connecting said transport slider with said double exposure blocking means.

3. A transport arrangement as defined in claim 2, wherein said connecting means is formed as a driving coupling connecting said transport slider with said double exposure blocking means.

4. A transport arrangement as defined in claim 1; and further comprising means for counting the frames and including a first element arranged on the camera and a second element provided on said transport slider and associated with said first counting element.

5. A transport arrangement as defined in claim 4, wherein said first element of said frame counting means is a frame counting scale arranged to be fixedly mounted on the camera and having a length corresponding to the stroke of displacement of said transport slider, whereas said second element of said frame counting means is a mark provided on said transport slider and associated with said scale.

6. A transport arrangement as defined in claim 1, wherein the camera has a longitudinal side, said transport slider being arranged so that it displaces along the longitudinal side of the camera.

* * * * *